Figure 3:
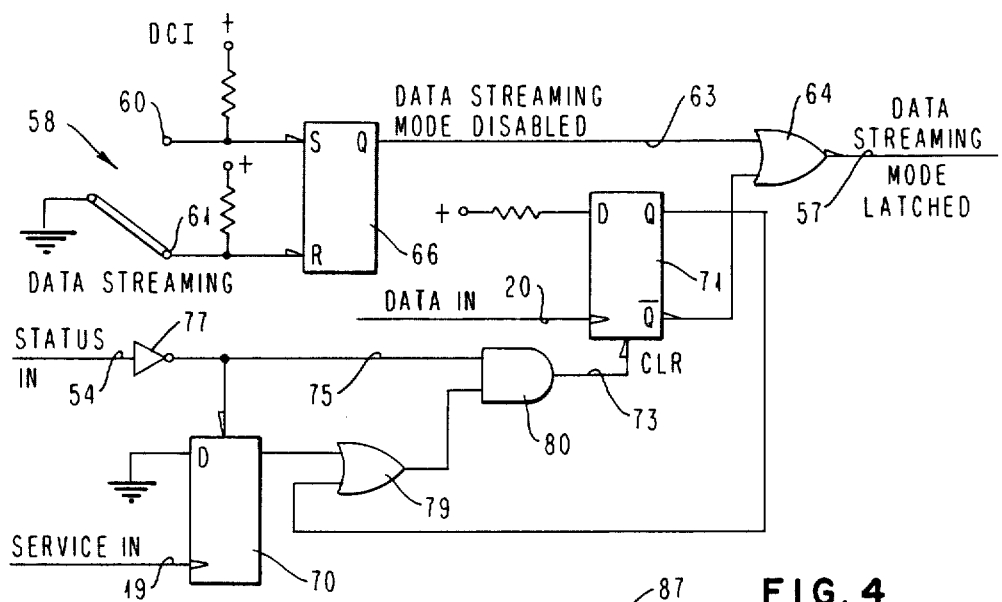

United States Patent [19]

Fredericks et al.

[11] Patent Number: 4,712,176
[45] Date of Patent: Dec. 8, 1987

[54] SERIAL CHANNEL INTERFACE WITH METHOD AND APPARATUS FOR HANDLING DATA STREAMING AND DATA INTERLOCKED MODES OF DATA TRANSFER

[75] Inventors: Kenneth J. Fredericks; Thomas W. Guerriero, both of Poughkeepsie; Gerald H. Miracle, Pleasant Valley; Michael R. Wiegand, Poughkeepsie, all of N.Y.

[73] Assignee: International Business Machines Corp., Armonk, N.Y.

[21] Appl. No.: 700,355

[22] Filed: Feb. 11, 1985

[51] Int. Cl.[4] .......................................... G06F 13/42
[52] U.S. Cl. ..................................................... 364/200
[58] Field of Search ................ 364/200, 900; 375/212; 370/32

[56] References Cited

U.S. PATENT DOCUMENTS 4,534,011 8/1985 Andrews et al. ................... 364/900

OTHER PUBLICATIONS

IBM Technical Disclosure Bulletin, vol. 19, No 8, Jan. 1977, "Serial Channel to I/O Interface, Lynch/Thorn.

Primary Examiner—Harkcom Gary V.
Assistant Examiner—David L. Clark
Attorney, Agent, or Firm—W. S. Robertson

[57] ABSTRACT

Data is transferred between a channel and a control unit in interlocked mode or in data streaming mode over a conventional parallel bus and a serial link that permits the control unit and the channel to be located farther apart than the length of the parallel bus. The serial link carries frames for the rise of the data transfer tags but not their fall, and these tags on the parallel bus are dropped by two circuits that connect the serial link to the parallel bus. In data streaming mode, one data transfer tag is dropped when the next data transfer tag is received on the serial link. The circuit at the control unit end of the serial link detects a pause in the tags to begin an operation to drop the last data transfer tags and both circuits respond to other conditions to drop the last data transfer tags according to the protocol of the parallel bus.

7 Claims, 5 Drawing Figures

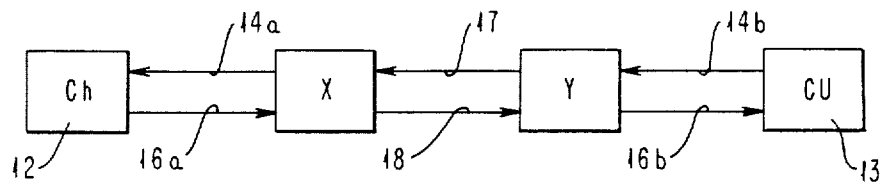
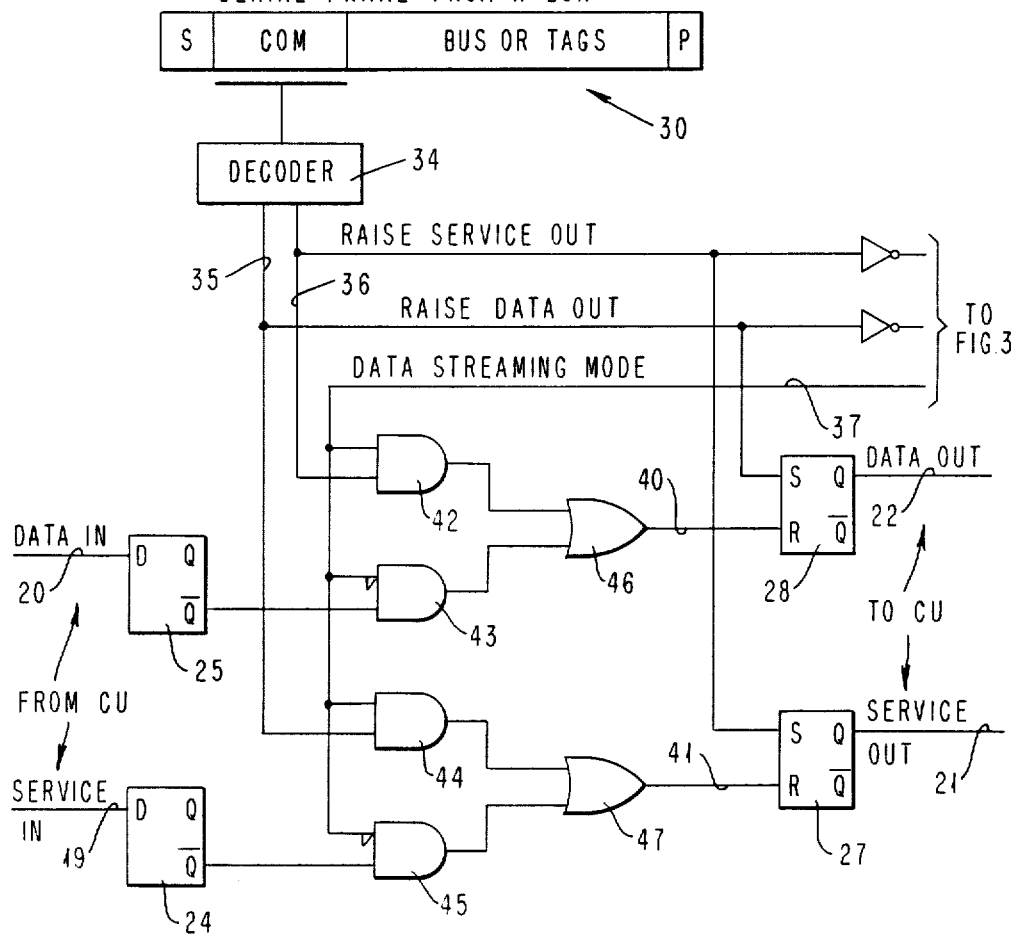

SERIAL CHANNEL INTERFACE WITH METHOD AND APPARATUS FOR HANDLING DATA STREAMING AND DATA INTERLOCKED MODES OF DATA TRANSFER

FIELD OF THE INVENTION

This invention relates to a data channel sub-system that connects a peripheral device of a data processing system to the central processor and the central processor memory. More specifically the invention relates to a serial link for extending the parallel bus that is conventionally used in the channel system.

Introduction: A Data Channel as Part of a Processor System

A familiar example of an I/O device is a terminal that has a cathode ray tube display and keyboard. The display provides an output from the processor to the user of the terminal, and the keyboard provides an input from the user to the processor. A coaxial cable from the display housing connects the terminal to a component that is called a control unit. This connection may run a few hundred feet. Circuits located in the the display housing handle communication with the control unit on this coaxial cable according to a protocol that handles the specific requirements of the device.

If the control unit is located within a few feet of the central processor, the control unit may have a multi-conductor cable that connects to a component of the central processor system that is called a data channel (or channel). In these data processing systems, processor memory is used as a buffer for data transfers between the central processor and peripheral devices, and a channel is a processor that handles data transfer operations between the bus and main memory.

This cable forms a bus that is described in a publication "IBM System/360 and System/370 Interface Channel to Control Unit Original Equipment Manufacturers' Information" and the bus is commonly called the "standard interface" or the "OEMI interface". Some of the lines of the bus and the associated operations will be described later.

If the control unit is located farther from the central processor, it is typically connected to a nearby communications controller that is connected to another communications controller that is located near the central processor. The communications controllers are interconnected by a telephone line or by some other serial line.

By contrast to the typical terminal arrangement, I/O devices such as disk drives are commonly located near a central processor and their controllers are connected to a channel by the multi conductor bus without intervening components. Thus, some I/O devices communicate directly with central processor memory using the protocol of the interface bus and some communicate at longer distances through different protocols. A general object of this invention is to provide a new and improved method and apparatus for extending the length of the bus with the standard interface protocol. Another object of the invention is to operate an extended bus in any of several known data transfer modes, and these data transfer modes will be reviewed next.

Data Transfer on the Parallel Bus

The parallel bus has a set of input lines (from the control unit in to the channel) and a set of output lines (from the channel out to the control unit). The output lines include a set of lines called Bus Out that carry one byte. The term information will be used as a general term for all of the lines of the bus and it will be used in a more specific sense to identify the contents of Bus Out. The specific terms address and command identify particular kinds of information on Bus Out, and the term data identifies for example a file that is transferred between main memory and a disk store. Data is also used for other kinds of information on Bus Out. Other output lines carry tag signals that identify Bus Out as carrying a device address (Address Out), a command (Command Out) or data (Service Out or Data Out). Similarly, the input lines from a control unit to the channel include Bus In and the tags Address In, Status In, Service In, and Data In.

The operations on the bus that will be described in this specification are performed to transfer data from the channel to the device or from a device to the channel. Other operations are performed for example to select a particular device for a data transfer or to transfer status and/or control information between the device and the channel. Some of these other operations will be described when they follow or precede a data transfer, but the introductory examples will usually be limited to a single data transfer.

A data transfer is controlled by the tags Service In, Service Out, Data In and Data Out, and these tags will be called collectively data transfer tags. The data transfer tags are raised and lowered in one of several predetermined sequences that control the progress of a data transfer, as will be reviewed next.

Data Transfer Tags for Interlocked Data Transfer

Data transfer on the interface takes place at different rates that are appropriate to different devices, and in the simplest case the rate is controlled by the two data transfer tags Service Out and Service In. These signals are interlocked by the requirement that the signals are changed only in the following sequence: the control unit raises Service In, the channel raises Service Out, the Control Unit drops Service In, and the Channel drops Service Out. The procedure is commonly called handshaking. The interlocked mode is also called direct current interlocked mode (DCI) because the entire length of the bus rises or falls to the potential of the signal. (Later, a different mode, called Data Streaming will be described.)

On an output operation, the rise of Service In means that the control unit is ready to receive the next byte and the rise of Service Out means that the channel has put the next byte on Bus Out. The fall of Service In means that the control unit has received the byte (and that the channel can drop the data on Bus Out), and the fall of Service Out means that the data on Bus Out is no longer valid. On an input operation, the interlocked sequence of tags is the same, but the meaning is different. The rise of Service In means that the control unit has put a byte on Bus In, and the rise of Service Out means that the channel has received the byte and that the control unit can drop the data on Bus In. The fall of Service In means that the control unit has dropped Bus In and the fall of Service Out means that the channel is ready for the next byte. Since the tag sequence is the same for the input operation and the output operation, it will be possible to describe just the tags without regard to the direction of the data transfer.

Data Streaming

In a data transfer mode called data streaming, a channel or a control unit raises a data transfer tag for a predetermined period of time and then drops the tag without waiting for a response by the receiving component. The receiving station sends the data transfer tags as in interlocked mode except that the tags are sent on the rise of the corresponding tag without waiting for the fall of the corresponding tag. (The tags are counted to check that the number of tags sent equals the number of tags received.)

Extending the Channel Interface

The length of the parallel bus is limited partly by the fact that the parallel signals become skewed: the signals reach a receiving station at slightly different times and extra time must be allowed for reading the signals. To overcome this limitation, it has been proposed to extend the parallel bus by means of a serial link between a channel and a control unit. The parallel bus is encoded into a serial frame, and the state of the bus is signaled by sending a serial frame over the input line or the output line.

The basic components of such a system have been described by Lynch and Thorn in the IBM Technical Disclosure Bulletin, Jan. 1977, pages 3139-3143. The system has a serial link comprising a serial input line (from the control unit to the channel) and a serial output line (from the channel to the control unit). At each end of the link there is apparatus for converting between the serial frame format of the incoming or outgoing serial line and the parallel form of the channel or the control unit.

To introduce the terminology that will be used in the description of the preferred embodiment, the apparatus at the channel end of the link will be called the X box and the apparatus at the control unit end of the link will be called the Y box. This terminology is arbitrary and it will be used as a general designation for apparatus having this function. Either of the boxes and the channel and the control unit will also be referred to generally as a sending station and a receiving station.

The X box and/or the Y box can be implemented as a separate box that is connected to a parallel bus or it can be integrated into the channel or the control unit. However, to describe the X and Y boxes from a simpler standpoint, they will ordinarily be described as two separate units.

Serializing the Parallel Bus

In the system of Lynch and Thorn, a sending station encodes the lines of the parallel bus in a serial frame and transmits the frame to the receiving station on a serial line. A frame for a data transfer carries the byte for Bus In or Bus Out and it carries a bit that represents the associated data transfer tag.

The receiving station converts the serial frame to a parallel form for processing and then raises or lowers signal levels on the lines of the parallel bus. For example, when the control unit puts data on Bus In and raises Service In on the parallel bus to the Y box, the Y box and the X box handle the serial link and the Y box raises Service In and puts the byte on Bus In of the parallel bus to the channel. In this example, the actual operation of the X and Y boxes is transparent to the control unit and the channel except for the added time delay in transmitting the frame over a longer distance and the delay in processing the serial frame.

In a second interlocked data transfer mode, the tag Data In is alternated with Service In and the tag Data Out is alternated with Service Out.

Dropping the Tags

Lynch and Thorn have proposed transmitting the rise of the data transfer tags on the serial bus, as in the preceding example, but not their fall. This procedure cuts in half the number of frames that are required for a data transfer and it substantially reduces the total number of frames for all operations. Our system uses the technique of Lynch and Thorn for dropping tags during an interlocked data transfer, and their system will be explained in detail later.

Summary of the Invention

One object of this invention is to extend the teaching of Lynch and Thorn to provide a channel extender that operates in data streaming mode. According to one feature of this invention, during a data transfer in data streaming mode, the X box and the Y box each drop one data transfer tag on the parallel bus when the next data transfer tag is received on the serial line from the other box.

The partial operation introduced in the preceding paragraph leaves the last data transfer tag high on the parallel bus. According to another feature of this invention, our circuit detects a pause in the data transfer tags on the incoming serial line and it drops the tags on the parallel bus after a time delay that corresponds to either the end of a sequence of tags or an interruption in the operation. The circuit then resets the data transfer tags on the parallel bus. In the preferred circuit, the operation is switched from data streaming mode to interlocked mode, and the tags are dropped. If the data transfer is only interrupted, the circuit then returns to data streaming mode.

Other objects and features of the invention will be apparent from the description of the preferred embodiment of the invention.

The Drawing

FIG. 1 is a block diagram of a prior art serial channel extender.

Figure 4:
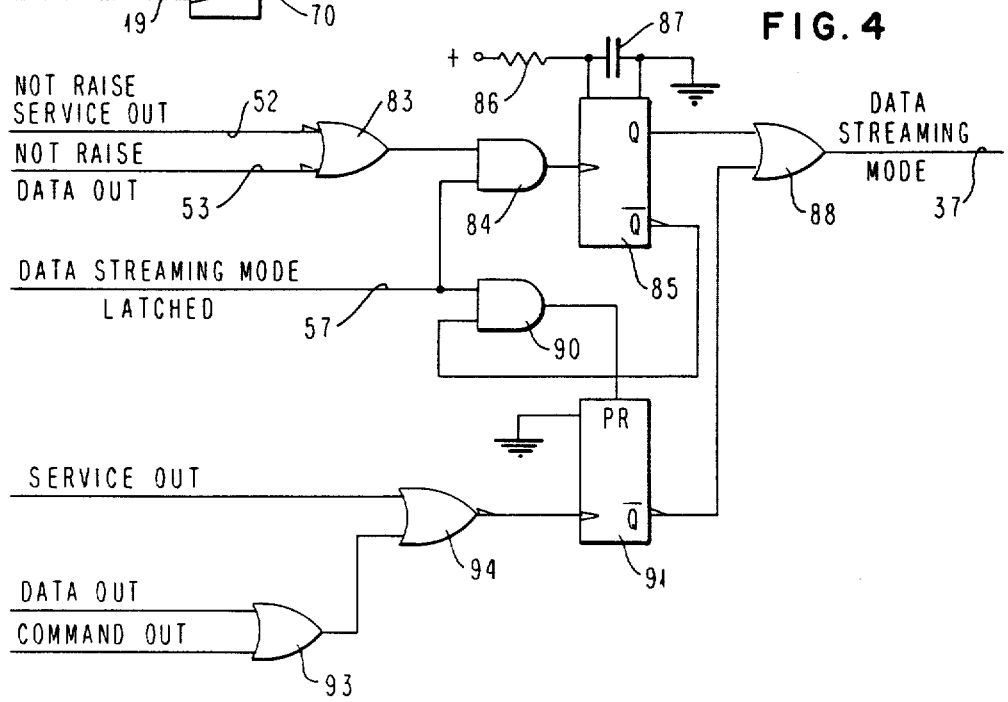
Figure 5:
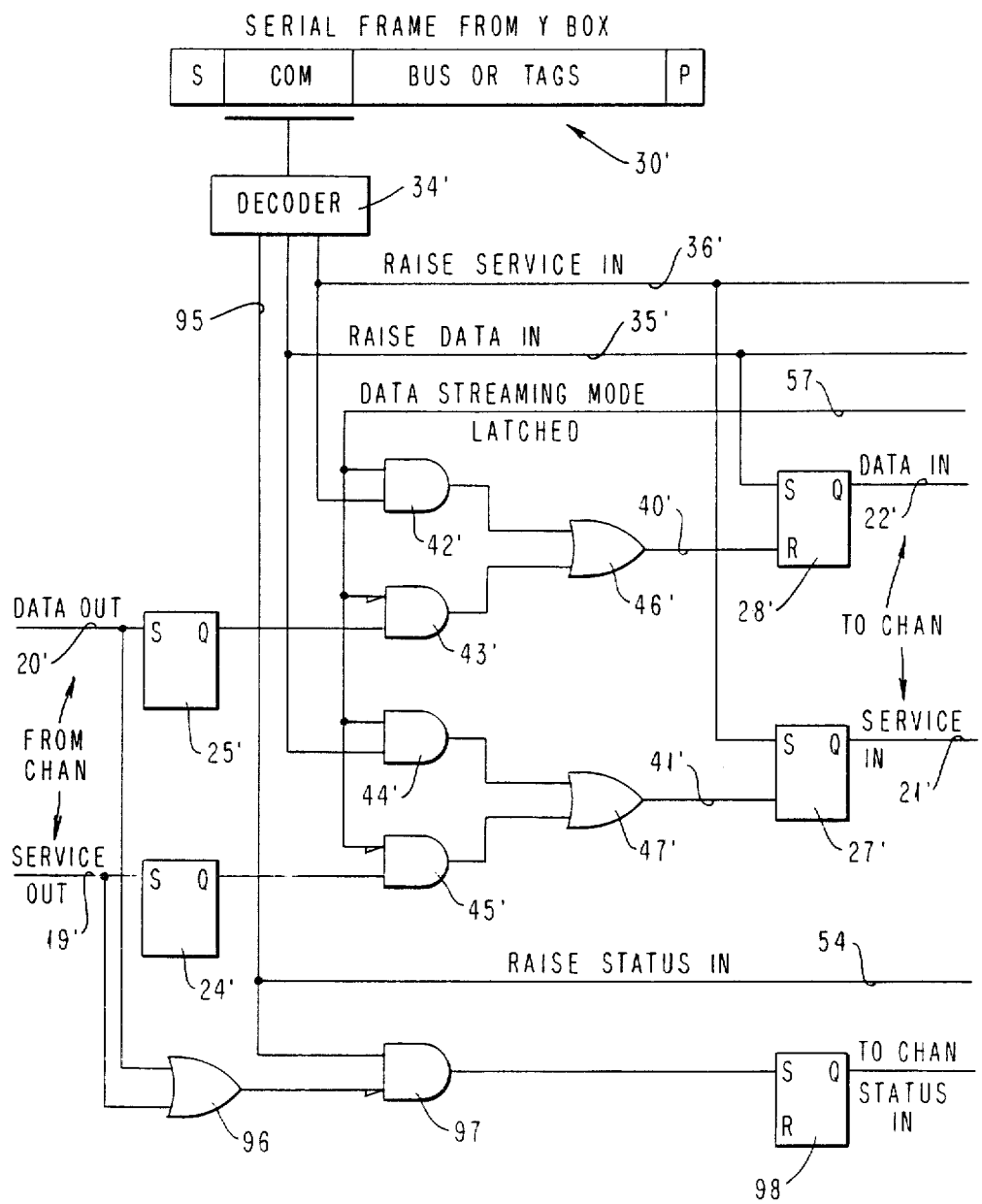

FIG. 2 shows apparatus in the Y box for converting between a serial frame and the parallel bus. FIG. 3 is schematic diagram of a circuit that detects a tag sequence that signals a data transfer in data streaming mode. FIG. 4 is a schematic diagram of a circuit that switches out of data streaming mode in order to drop the last tags on the parallel bus. FIG. 5 is similar to FIG. 2 and shows apparatus in the X box for converting between a serial frame and the parallel bus.

Introduction—FIG. 1

FIG. 1 shows a data channel 12, a control unit 13, and the conventional parallel bus 14a, 14b, 16a, 16b that interconnects the control unit and the channel. The channel is conventionally connected to a central processor and to central processor memory (not shown) and the control unit is connected to an I/O device in any suitable configuration. The input lines 14a, 14b are shown separately from the output lines 16a and 16b in the drawing, and the bus is divided by the serial link of this invention into two parts identified by the subscripts a and b. The serial link includes an X box connected to the channel by bus parts 14a and 16a, a Y box connected to the control unit by bus parts 14b and 16b, a serial input line 17, and a serial output line 18.

The single channel 12 is representative of a large number of channels typically used in a data processing system. The single control unit is representative of several control units that can be connected to the control unit end of the parallel bus 14b, 16b, and other control units can be similarly connected to the channel end of the parallel bus 14a, 16a.

In the preferred system, the channel and the control unit have no changes in structure or operation that are relevant to the serial link. The channel puts signals on part 16a of the parallel bus and receives signals on part 14a of the parallel bus without regard to the serial link. Similarly, the control unit puts signals on part 14b of the parallel bus and receives signals on part 16b of the parallel bus as though the system did not have a serial link.

Command and Tag Processing—FIG. 2

FIG. 2 shows the components in the Y box that handle commands and tags. The Y box receives the incoming lines 14b of the parallel bus from the control unit, and it produces signals on the outgoing lines 16b of the parallel bus to the control unit. The drawing shows Service In and Data In on lines 19 and 20 respectively from the control unit and Service Out and Data Out on lines 21 and 22 respectively to the control unit. Latches 24 and 25 for the incoming tags and latches 27 and 28 for the outgoing tags are representative of registers for both parts of the bus. These registers are preferably part of the Y box but may be part of an integrated unit comprising a Y box and a control unit. In a system without the serial link, lines 19 and 20 would continue to the channel and lines 21 and 22 would originate at the channel.

In this system, the signals that are applied to lines 21 and 22 reach the Y box in a serial frame 30 from the X box, and lines 19 and 20 from the control unit are similarly encoded in a serial frame and sent to the X box for presentation to the channel on the parallel bus.

FIG. 2 shows the format of the serial frame 30. Bit position 0 of the frame is a start bit. A few 0 bits are transmitted between frames, and the start bit is a 1, as is conventional. The next three bit positions hold a three bit code that represent the tags Data Out (011) and Service Out (010) for the operations that will be described. During a data transfer from the channel to the control unit, bit positions 4 through 11 of the frame carry the byte on Bus Out and this byte is applied to the Bus Out lines of the parallel bus 16b to the control unit. Bit position 12 is a parity bit.

A decoder circuit 34 decodes the command bits of the frame in a conventional way, and it produces the signals Raise Data Out and Raise Service Out on lines 35 and 36 respectively when the command code signifies that these tags accompany the data frame. A line 37 from FIG. 4, described later, is high to signal that the data transfer is in data streaming mode and low to signify that the operation is in interlocked mode.

The incoming latches 24 and 25 are set in response to a 1 bit on the corresponding tag line 19 or 20 of the parallel bus to the Y box. These latches are conventionally reset by the control unit when it drops the corresponding signal on the parallel bus. The outgoing latches 27 and 28 have their set inputs connected to the lines 36 and 35 respectively from the command decoder 34. When a latch 27 or 28 is set, the corresponding tags are raised on the parallel bus part 16b.

The outgoing latches 27 and 28 are reset by signals on lines 41 and 40 respectively that are formed by a logic network of gates 42 through 47. In interlocked mode, the logic network drops the data transfer tags in the way taught by Lynch and Thorn. Line 37 is down, and this signal is inverted at the inputs to And gates 43 and 45, and gates 43 and 45 are enabled to respond to their other inputs when the operation is not in data streaming mode. Gate 43 receives the Not Q output of latch 25 and gate 45 receives the Not Q output of latch 24. When the control unit drops Service In on line 19, latch 24 is reset, and gates 45 and 47 transmit a reset signal to reset latch 27 and thereby drop Service Out on line 21. Similarly, when the control unit drops Data In on line 20, latch 25 is reset, and gates 43 and 46 transmit a reset signal to reset latch 28 and thereby drop Data Out on line 22.

In data streaming mode, the X box and the Y box each drop one data transfer tag on the parallel bus when it raises the other data transfer tag. When line 38 is high (Data Streaming Mode = 1), And gates 42 and 44 are enabled to respond to the decoder output signals on lines 36 and 35 respectively. When the Y box receives a frame 30 for Data Out, decoder 34 raises line 35. Gates 44 and 47 transmit this signal to reset latch 27 and thereby drop Service Out on line 21 of the parallel bus part 16b. Similarly, when the Y box receives a frame 30 for Service Out, decoder 34 raises line 36 and gates 42 and 46 transmit this signal to reset latch 28 and thereby drop Data Out on line 22 of the parallel bus part 16b.

FIG. 2 also shows inverters 49 and 50 that are connected to lines 35 and 36 and produce the complement signals Not Raise Service Out and Not Raise Data Out on line 52 and 53 respectively.

The X Box

The X box will be explained later in the description of FIG. 5 but the corresponding features of the X box can be understood from FIG. 2 by noting that signals that are received by the Y box from the parallel bus are received by the X box in a serial frame and visa versa. As an example, in the Y box line 19 (Service In) and line 20 (Data In) are part of the parallel bus 14b in FIG. 1. The Y box forms a serial frame with the three bit command code for Service In (010) or Data In (011) and transmits the frame to the X box and lines corresponding to 19 and 20 appear at the output of the decoder like lines 35 and 36 in FIG. 2. The X box decodes the command and puts the appropriate signals on part 14a of the parallel bus to the channel. Later, the X box drops the tags on the parallel bus.

Conversely, the X box sends the Y box a frame for Service Out (010) or Data Out (011) and the Y box puts the data on Bus Out lines of bus part 16b and puts the appropriate tag on line 21 or 22 of bus part 16b.

Enabling Data Streaming Mode—FIG. 3

Some devices and some systems operate only in interlocked mode, and a manual switch 58 is movable between terminals 60 and 61 to disable data streaming mode (at terminal 60) or to enable either data streaming mode or interlocked (DCI) mode (at terminal 61). The switch position is converted to a logic signal Data Streaming Mode Disabled on a line 63. When switch 58 is in the Data Streaming position that is shown in the drawing and line 63 is low, an Or Invert gate 64 is enabled to respond to its other input to raise or lower a signal Data Streaming Mode Latched on line 57 for a particular data transfer.

In the specific circuit of FIG. 3, a latch 66 converts the signal at switch terminals 60, 61 to a suitable logic level on line 63. An up level on line 63 signifies Data Streaming Mode Disabled. The set and reset inputs (S and R) of the latch are connected by resistors to receive up voltage levels representing 1 logic levels. The half arrows in the drawing represent that the latch responds to a down level, and the 1 level produced by the resistors has no effect on the state of the latch. The manual switch 58 connects the latch input to ground potential to set or reset the latch.

Detecting Data Streaming Mode—FIG. 3

If data streaming mode is enabled by switch 58, the control unit establishes the operating mode for a data transfer (in either direction). A control unit signals a data transfer in data streaming mode by raising Data In for the first data transfer. The control unit then raises Service In for the second data transfer and raises Data In and Service In alternately for further data transfers. If the control unit raises Service In first, the channel and control unit operate in an interlocked mode. (The channel and control unit operate in one interlocked mode if the control unit uses only the Service In tag and in a second interlocked mode if the control unit rises Service In first and then alternates Data In and Service In. However, this distinction is not significant in the circuit of FIG. 3.)

Latches 70 and 71 are connected to detect these tag sequences, and the set state of latch 71 produces the signal Data Streaming Mode Latched =1 on line 57. Latch 70 is set at the beginning of a data transfer and latch 71 is reset at the beginning of a data transfer, as will be explained. The set state of latch 70 enables latch 71 to be set by Data In. Latch 70 is reset on the first rise of Service In, and latch 71 is not set unless Data In rises before Service In.

In the specific circuit, latch 70 has its preset input connected to receive Status In on line 54 at the output 75 of an inverter 77. Latch 70 is preset when Status In rises at the beginning of a data transfer. (Latch 70 is set by a down level at its preset input without regard to its other inputs. See the explanation of the half arrows of latch 66.) The data input D of latch 70 is connected to ground which represents a 0 logic level. The clock input of latch 70 is connected to receive Service In on line 19, and latch 70 is reset when Service In rises. Thus the Q output of latch 70 is up from the beginning of a data transfer until the first rise of Service In.

The inverted clear input of latch 71 is connected to the Q output of latch 70 through an Or gate 79 and an And gate 80. While the output of And gate 80 on line 73 is down, latch 71 is kept reset. (The clear input to a latch resets the latch without regard to its other inputs.) When line 73 is down, latch 71 is reset, and when line 73 is up latch 71 is enabled to be set. The logic condition for enabling latch 71 to be set is Not Status In And (Latch 70 Set or Latch 71 Set). Thus, latch 71 is reset on the rise of Status In and it can be set in the interval from the fall of Status In to the resetting of latch 70 with the rise of Service In.

The clock input of latch 71 is connected to receive Data In on line 20, and the clear input of latch 71 is connected to the Q output of latch 70 to enable latch 70 to be set in response to Data In during the interval between the fall of status in and the first rise of Service In.

When the data transfer is in data streaming mode and latch 71 is set, if Data In rises before Service In to signal data streaming mode, latch 70 is set by the rise of the previous Status In and latch 71 sets on the rise of Data In. The Q output of latch 71 is connected to Or gate 79 so that when latch 71 sets on the rise of Data In it remains set without regard to the fall of the output of latch 70 when Service In later rises. Conversely, if Service In rises before Data In, latch 71 is reset by the fall of the signal on line 73 and it does not respond to the rise of Data In.

Detecting the Data Transfer Tags—FIG. 4

Notice that the signal Data Streaming Mode Latched on line 57 remains up throughout the data transfer in data streaming mode. By contrast the circuit of FIG. 4 drops the line 37 at a point in the data transfer where the last tags are to be dropped. The circuit of FIG. 4 receives Data Streaming Mode Latched on line 57 and produces the signal Data Streaming Mode on line 37 that was introduced in the description of FIG. 2. The circuit of FIG. 4 receives other signals that are used to control the time when Data Streaming Mode is dropped on line 37. The circuit of FIG. 4 is located only in the Y box.

Not OR gate 83 receives signals Not Raise Data Out and Not Raise Service Out on lines 52 and 53 respectively from FIG. 2. The inputs to gate 83 are inverted and gate 83 produces the logic function Raise Service Out Or Raise Data Out. In data streaming mode the signals Raise Service Out and Raise Data Out rise and fall alternately, and a pulse appears at the output of gate 83 during each data transfer period. (Pulses are required because a line may remain up or down when the data transfer is stopped.) The line Data Streaming Mode Latched from FIG. 3 enables an And gate 84 to transmit the output of gate 83 to a latch 85. Latch 85 is connected with a resistor 86 and a capacitor 87 to form a conventional retriggerable single shot circuit. A pulse Data Streaming Mode Latched and (Raise Data Out OR Raise Service Out) sets the latch and thereby raises its Q output and also restarts its timing cycle. An Or gate 88 transmits the Q output of latch 85 to form the signal Data Streaming Mode on line 37.

If the sequence of Data Out and Service Out frames on the serial line stops for a sufficient time, latch 85 times out and its Q output falls and its Not Q output rises. In the preferred implementation a data transfer takes about 880 nanoseconds and latch 85 is timed to reset after about 5 microseconds. From a more general standpoint, latch 85 is set during a substantially unbroken sequence of data transfer tags and it is reset after a time interval that corresponds to the end of a sequence of data tags or to an interruption in the sequence that will be described later.

Operation—Dropping the Last Out Tags

Before the data transfer begins, the channel performs an information exchange with the control unit that is called initial selection. At the end of initial selection, the control unit puts a status byte on Bus In and raises the tag Status In on line 54, and the channel then raises Service Out which appears on line 36. The control unit then drops Status In and the channel drops service out. The control unit can then raise Service In or Data In as has already been described. Note that either the channel or the control unit sends a data transfer frame with a data byte and that the other sends the corresponding frame without data significance in bit positions 4–12.

When the channel sends the last out tag, the X box sends a serial frame to the Y box and the Y box raises the tag line 21 or 22 (FIG. 2) on the parallel bus in the way already described. The tag is not by itself identifiable as the last tag. In this example the data transfer has been completed and the control unit does not raise a data transfer in tag. In FIG. 2 the latch 27 or 28 remains set and the out tag remains up on line 21 or 22 of the parallel bus part 16b. In the circuit of FIG. 4, latch 85 times out after the last out tag and line 37 falls. The fall of line 37 returns the circuit of FIG. 2 to interlocked operation and the latch 27 or 28 which is set for the raised transfer out tag receives a reset pulse from latch 24 or 25 in the way already described. The data transfer may later be continued as will be described or the control unit may complete the data transfer by putting its ending status on Bus In and raising the tag Status In. In response to Status In, latch 71 is reset to produce the signal Data Streaming Mode Latched =0 on line 57.

Operation with Suppress Out—FIG. 4

The channel can stop an I/O operation temporarily by raising a tag Suppress Out. (Suppress Out is sent as a frame with the command 000 or 001 or as a tag frame with the command 100 and bit 9 set.) In response to Suppress Out, the control unit stops generating data transfer In tags, and latch 85 in FIG. 4 times out and drops Data Streaming Mode on line 37 as already explained. In the circuit of FIG. 2 the signal Data Streaming Mode falls and the out tags are dropped in the way already explained. The circuit of FIG. 4 then raises Data Streaming Mode on line 37 to be ready to continue the data transfer. This operation in FIG. 4 will be explained next.

An And gate 90 responds to Data Streaming Mode Latched on line 57 and to the Not Q output of latch 85 to raise its output at the end of a sequence of data transfer Out tags. The output of And gate 90 is connected to the preset input of a latch 91, and while this signal is low, latch 91 is preset. The Not Q output of latch 91 is one of the two inputs to Or gate 88, and this input falls when latch 91 is preset. When latch 91 is set after latch 85 has reset, the signal Data Streaming Mode falls on line 37. The out tags then fall as already explained.

Gates 93 and 94 form a three way Or Invert circuit for the tags Service Out and Data Out from lines 21 and 22 respectively of FIG. 2 and the tag Command Out. The tag Command Out is down during the operation being described and will be explained separately. When Service Out and Data Out have been dropped, the output of gate 94 rises, latch 91 is reset, and the signal Data Streaming Mode rises on line 37.

When the signal Data Streaming Mode Latched falls on line 57 at the end of a data transfer in data streaming mode, the output of And gate 90 falls, latch 91 is set, and Data Streaming Mode falls on line 37.

The channel can end a data transfer by raising Command Out in place of one of the data transfer tags. In this case, latch 85 times out and Data Streaming Mode falls in the way already described. However, the up level of Command Out prevents latch 91 from being reset, and the operation remains in interlocked mode for handling the ending sequence.

Dropping the Last in Tag—FIG. 5

In the explanation so far, the X box has been assumed to be a direct counterpart of FIGS. 2 and 3. As already explained, the X box does not have the circuit of FIG. 4. The last in tag from the control unit and the Y box is dropped by the circuit and circuit operations of FIG. 5.

FIG. 5 includes many of the reference characters from FIG. 2 with a prime to indicate that the components correspond for explanation but are not identical. For example, latch 25 in FIG. 2 receives the tag line Data In on the parallel bus from the channel, and latch 25' in FIG. 5 receives the corresponding tag line Data Out from the channel.

The channel may raise Command Out to end an operation (for example when the channel has received the desired number of bytes from the control unit). In the way already explained, line 37 is dropped in the Y box but line 57 in FIG. 5 remains up in the X box. The data transfer tags that are on the parallel bus and on the serial line are propagated to the channel and the control unit and additional tags are sent to acknowledge these tags. At the end of the data transfer, the control unit puts Status In on the parallel bus to the Y box, the Y box sends the serial frame to the X box, and line 95 rises at the output of the decoder 34'. At an appropriate point in time, the circuit of FIG. 5 sets latch 98 and raises the tag Status In to the channel on the parallel bus. In the circuit of FIG. 3, the rise of Status In causes Data Streaming Mode Latched to fall in the way already described. In FIG. 5, the fall of Data Streaming Mode Latched resets either latch 27' or 28' as has been explained in the description of FIG. 2. The channel then drops the tag on either line 19' or 20' as part of its normal operation. In FIG. 5, And gate 97 and Or gate 96 cooperate to set the latch 98 and raise Status In to the channel in the proper sequence.

Other Embodiments

Those skilled in the art will recognize that the preferred circuit can be implemented in various ways within the spirit of the invention and the scope of the claims.

What we claim is:

1. Apparatus (the X box or Y box) for exchanging signals between a serial link and a parallel buss connected to one of a channel and a control unit,
   the channel and control unit having means for transferring a series of data units on the parallel bus in a data streaming mode using alternating first and second data transfer tags from the control unit to the channel (Service In alternating with Data In) and corresponding alternative first and second tags from the channel to the control unit (Service Out alternating with Data Out) or in an interlocked mode,
   the serial link connecting said apparatus in both directions (Input and Output) with a similar apparatus (another X or Y box) also connected by a parallel bus to the other of said channel and control unit,
   said apparatus having means for receiving said data transfer tags on said parallel bus and transmitting on said serial link a frame containing the identification of the received tag and having means for receiving a serial frame containing the identification of one of said data transfer tags and raising the corresponding data transfer tag on the parallel bus,
   wherein the improvement comprises, means (70, 77, 79, 80) for detecting said interlocked mode of data transfer and said data streaming mode of data transfer on the parallel bus and means (71) for producing a signal (57) identifying whether the channel and control unit are operating in data streaming mode, means (35, 36, 42, 44, 46, 47) responsive to said signal identifying that said channel and control unit are operating in data streaming mode for dropping a data transfer tag on the parallel bus in response to the receipt of the next of said data transfer tags in said series of data units on the serial bus, and means responsive to said signal identifying that said channel and control unit are operating in data streaming mode for detecting the end of the data transfer and for controlling said tag dropping means to drop a last data transfer tag.

2. Apparatus (Y box) for connecting a parallel bus of a control unit to a serial link, the serial link being connected by another similar apparatus (X box) and a similar parallel bus to a channel, the channel and control unit having means for transferring a series of data units on the parallel bus in a data streaming mode raising and lowering alternatimg first and second data transfer tags from the control unit to the channel (Service In alternating with Data In) and corresponding alternative first and second tags from the channel to the control unit (Service Out alternating with Data Out) or in an interlocked mode, said apparatus having means for receiving said data transfer tags on said parallel bus from the control unit, means for transmitting on said serial link a frame containing the identification of the received tag, means for receiving on the serial link from the other apparatus, a serial frame containing the identification of a corresponding data transfer tag from the channel and means for raising the corresponding data transfer tag line on the parallel bus to the control unit, wherein the improvement comprises, means for detecting a sequence of said tags on the parallel bus from the control unit signifying an interlocked mode of data transfer or a data streaming mode of data transfer, and means (71) for producing a signal (57) identifying whether the channel and control unit are operating in data streaming mode or in interlocked mode, means responsive to said signal identifying that said channel and control unit are operating in data streaming mode for dropping one of said corresponding data transfer tags on the parallel bus to the channel in response to the receipt of the next data transfer tag in said series of data units on the serial bus, and means responsive to said signal identifying that said channel and control unit are operating in data streaming mode for detecting the end of the data transfer or a pause in the data transfer and for controlling said tag dropping means to drop a last data transfer tag on the parallel bus to the control unit.

3. The apparatus of claim 2 wherein said means for detecting the end of the data transfer or a pause in the data transfer comprises means for detecting a pause for a predetermined time in the sequence of data transfer tags (latch 85).

4. The apparatus of claim 3 wherein said means for detecting a pause in teh sequence of data transfer tags comprises means for producing a pulse for each serial output frame containing a data transfer tag (83, 84) and a timing circuit (85, 86, 87) for signaling the occurrence of a predetermined time interval beginning with the last of the pulses in said series of data units.

5. The apparatus of claim 4 including means (43, 45, 46, 47) responsive to the interlocked mode signifying state of said identifying signal for dropping an out tag (Service Out or Data Out) to said control unit in response to the fall of the previously raised in tag (Service In or Data In) from the control unit, wherein said means for controlling said tag dropping means to drop a last data transfer tag after a pause has been detcted comprises means for signaling said means for dropping tags to switch the operation to interlocked mode after said pause.

whereby the last out tag is dropped in response to a raised tag from the control unit.

6. The apparatus of claim 5 wherein said means for dropping a last out tag comprises means for returning to data streaming mode if the data transfer tags from the channel are continued after said pause and before the end of the data transfer.

7. A system for extending a parallel bus between a channel and a control unit, the channel and control unit having means for transferring a series of data units on the parallel bus in a data streaming mode by raising and lowering alternating first and second data transfer tags from the control unit to the channel (Service In alternating with Data In) and corresponding alternating first and second tags from the channel to the control unit (Service Out alternating with Data Out) or in an interlocked mode, comprising, a serial link and apparatus for connecting one end of the serial link to the parallel bus at the channel and similar apparatus (X box) for connecting the other end of the serial link to the parallel bus to the channel, said apparatus comprising means for receiving said data transfer tags on said parallel bus from the control unit, means for transmitting on said serial link a frame containing the identification of the received tag, means for receiving on the serial link from the other apparatus a serial frame containing the identification of one of said corresponding data transfer tags from the channel and means for raising the corresponding data transfer tag line on the parallel bus to the control unit, means for detecting a sequence of said tags from the control unit signifying that the channel and control unit are operating in an interlocked mode of data transfer or in a data streaming mode of data transfer and for producing a signal identifying the mode of data transfer, means responsive to the data streaming mode signifying state of said identifying signal for dropping one of said corresponding data transfer tags on the parallel bus in response to the receipt of the next data transfer tag on the serial bus, means in the apparatus at the control unit end of the link responsive to the data streaming mode signifying state of said identifying signal for detecting a pause in said series of tags and for dropping a data transfer tag on the parallel bus to the control unit and means in the apparatus at the channel end of the link responsive to a tag from the control unit (status in) signifying the end of the data transfer for dropping the last data transfer tag on the parallel bus to the channel.

* * * * *